United States Patent
Kim et al.

[19]

[11] Patent Number: 6,149,420
[45] Date of Patent: *Nov. 21, 2000

[54] MOLD WITH INDICIA FORMING CHANGEABLE CORE

[75] Inventors: Kwan Sub Kim; Young Cheol Kim, both of Suwon, Rep. of Korea

[73] Assignee: SamSung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 09/026,674

[22] Filed: Feb. 20, 1998

[30] Foreign Application Priority Data

Feb. 20, 1997 [KR] Rep. of Korea ........................ 97-5099
Feb. 20, 1997 [KR] Rep. of Korea ........................ 97-5100

[51] Int. Cl.[7] .................................................. B29C 33/00
[52] U.S. Cl. ...................................... 425/192 R; 249/103
[58] Field of Search ................................ 249/103, 104; 425/192 R

[56] References Cited

U.S. PATENT DOCUMENTS

| | | | |
|---|---|---|---|
| 1,586,352 | 5/1926 | Cochran | 249/104 |
| 1,897,893 | 2/1933 | Evans | 249/103 |
| 3,354,509 | 11/1967 | Ammondson | 249/103 |
| 3,380,121 | 4/1968 | Chittenden et al. | 249/104 |
| 3,734,448 | 5/1973 | Rusk et al. | 249/103 |
| 3,883,109 | 5/1975 | Hahne | 249/103 |
| 4,254,933 | 3/1981 | Netto | 249/103 |
| 4,384,702 | 5/1983 | Boskovic | 249/103 |
| 4,708,314 | 11/1987 | Kuhnling | 249/103 |
| 4,979,720 | 12/1990 | Robinson | 249/103 |
| 5,038,504 | 8/1991 | Modigh | 249/103 |

*Primary Examiner*—James P. Mackey
*Attorney, Agent, or Firm*—Robert E. Bushnell, Esq.

[57] ABSTRACT

A core mold that has a mounting hole on its molding surface and a changeable indicia forming section that is used to form markings on an external surface of injection molded products. The indicia forming section is located on one end of a changeable indicia forming insert. The insert is detachably inserted into the mounting hole of the core mold. A step is also used to prevent the changeable indicia forming insert from moving relative to the core mold. The changeable indicia forming insert is detachably inserted to the core mold so that the indicia forming section is easily changeable by changing the insert. This avoids the delays caused by using core molds and inserts bearing indicia forming sections that are integrally formed from a unitary piece of material. Additionally, the information conveyed by the markings is greater than that possible using core molds with rotary cores. The mold of the present invention improves work efficiency during the manufacturing process by reducing the delay caused by changing indicia forming inserts. This leads to a corresponding reduction in production costs and allows products to be sold at more competitive prices. Furthermore, the markings formed by the present invention are all relevant to the product produced, as opposed to the marks created by rotary cores, thus eliminating potential consumer confusion. This invention is applicable to any molding processes, such as die-casting, plastic injection molding, and metallic injection molding.

10 Claims, 3 Drawing Sheets

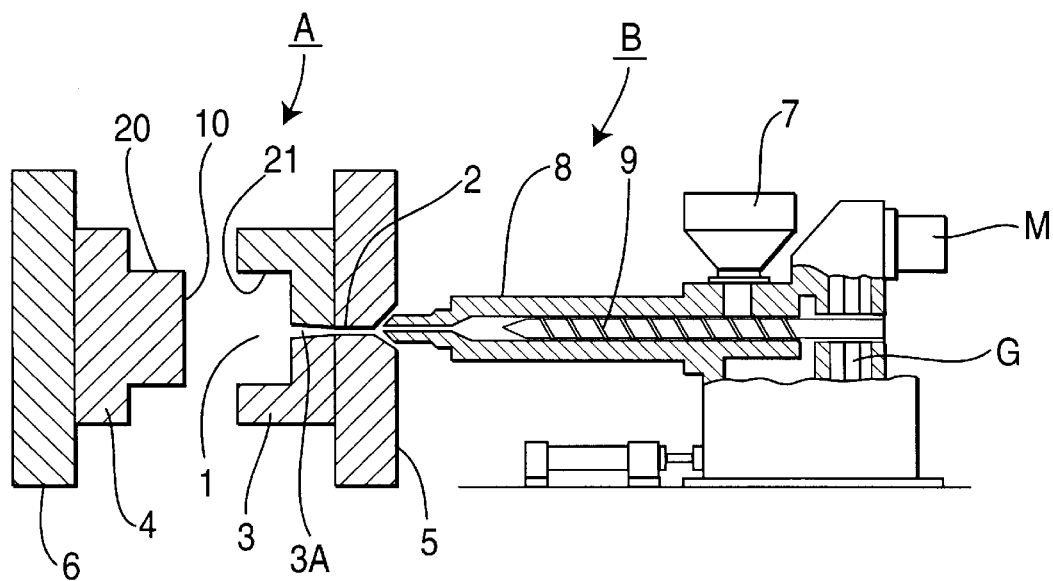
FIG. 1
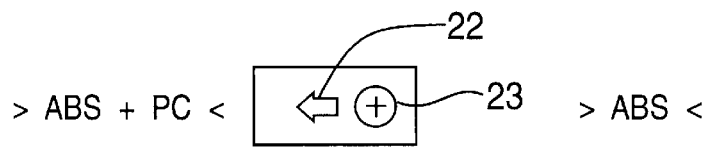
FIG. 2
PRIOR ART
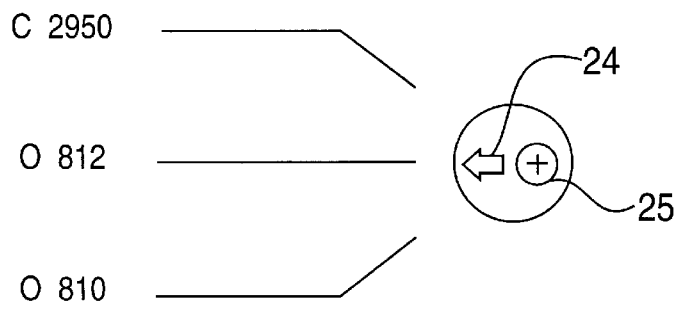

MOLD WITH INDICIA FORMING CHANGEABLE CORE

CLAIM OF PRIORITY

This application makes reference to, incorporates the same herein, and claims all rights accruing thereto under 35 U.S.C. §119 through my patent application entitled Mold With Indicia Forming Changeable Core filed in the Korean Industrial Property Office on the Feb. 20, 1997 and there duly assigned Serial No. 1997/5099 and 1997/5100.

BACKGROUND OF THE INVENTION

1. Field of the Invention

The present invention relates to molds used to form products, such as monitor casings and engine blocks, and, more specifically, to a mold having a core for creating indicia markings in formed products that is easily changeable with another core when it is necessary to change the content of the indicia.

2. Background Art

Molds with removable inserts for mold frames are in use and are especially valuable for prototype or low production molding needs that require the tooling be changed after relatively short runs. However, the known molds of this type still require substantial changeover time and the need exists for an inexpensive mold system requiring minimal changeover time and machining operations.

Monitor housings are formed through an injection molding process that often uses indicia markings to identify the type of plastic used and the grade of plastic. An injection molding system, may use both a mold and an injection molding machine. The mold contains a core mold and a cavity mold. The cavity mold contains a cavity that is filled with molten resin that is injected through a nozzle. The core mold is inserted into the cavity mold causing the outer surface of the core mold to slide flush inside of the inner surface of the cavity mold. A cavity is formed between the core mold and the cavity mold when the two molds are fully engaged together. Top and bottom clamp plates are mounted on the back surfaces of the core mold and the cavity mold, respectively. A locking member is fixed to each of the two clamp plates to secure the two molds prior to beginning the molding process. The locking member is then removed prior to separating the molds to extract the product.

The injection molding machine may be constructed using a hopper that is mounted to the rear end portion of a longitudinal heating cylinder. Molten resin is introduced to the heating cylinder via the hopper. The heating cylinder heats the molten resin using a heating means to maintain the molten state of the resin while feeding the resin into the mold. A rotatable screw is axially positioned in the heating cylinder and the cylinder is connected to a motor via a reduction gear. Thus, the screw is rotationally driven by the motor. The screw plasticizes the molten resin, acts as a typical plunger, and is operated by a cylinder actuator.

To form a product, such as the front and rear housings for a monitor, using the above injection molding system, molten resin is introduced into the heating cylinder through the hopper. Then, the resin is fed to the front end of the cylinder while being heated and plasticized by both the cylinder and the screw. In the front end of the heating cylinder, the molten resin is pressurized by the screw prior to being injected into the cavity formed between both the core mold and the cavity mold. The molten resin travels from the heating cylinder into the cavity via the nozzle of the cylinder and the sprue of the top clamp plate of the cavity mold. The molten resin in the cavity is then formed into the desired product that has a shape that corresponds to the shape of the cavity.

It is often preferable to create a stamped figure or letter indicia on the product to indicate either the manufacturer or the material of the product used during the injection molding process. To create the desired stamp on the injection molded product, an indicia forming segment may be integrated with the core mold in a position facing the cavity.

However, using an integrated indicia forming segment is problematic in that it is very difficult to change the content of the indicia. Thus, when it is necessary to change the existing content of the indicia, the existing content of the indicia has to be removed from the section through a grinding process prior to securing the new content on the portion. Therefore, the integrated indicia forming portion reduces work efficiency in the changing of the content of the indicia and increases the production cost of the products.

It is often necessary to stamp an indicia that indicates the kind of resin used, onto the surface of a molded product. Furthermore, it is not uncommon for a manufacturer to selectively use two or more kinds of resins in any particular injection molding process. Thus, necessitating a different indicia forming segment for each type of plastic or composite used. To allow multiple combinations or types of plastic to be used without introducing long delays to change the indicia forming segment, a rotary core can be used that has an arrow mark that can be oriented to indicate the type of resin that was used to form the product. For example, when one of two kinds of resins, ABS resin and ABS+PC resin, is selected for use in an injection molding process, a rotary arrow is oriented so that the stamp will show the arrow pointing to the appropriate resin identifier. The indicia forming segment has two stamps, one having the indicia ABS and the second having the indicia ABS+PC. The indicia forming segment is attached to the core mold and contains a rotary core that has an arrow mark that is rotatably mounted in the core mold at an intermediate position between the two stamps. When the resin used in the injection molding process is changed from one of ABS or ABS+PC to the other, the rotary core is rotated by a user to indicate the kind of resin used by aligning the arrow with the appropriate indicia. A rotary core that uses an arrow mark may also be used to indicate the grade of a resin used in the injection molding process. For example, if a manufacturer were using the three grades of resins C 2950, O 812 and O 810 alternatively in different injection molding processes, three stamps could be oriented around the rotary core to enable easier changing of the identification of the resin a product is constructed with.

Some developments in changeable core technology are shown, for example, in U.S. Pat. No. 4,210,196 to Weiner entitled Die Casting Apparatus and U.S. Pat. No. 4,828,479 to Pleasant entitled Molding Apparatus. Contemporary indicia forming segments using a rotary core can be problematic in that having multiple stamps on one product make it more difficult to read the indicia and reduce the competitiveness of the product.

I believe it may be possible to improve on the art of indicia forming segments by providing an indicia forming segment that can be easily changed, that can create more complicated labels than that typically created with rotary cores, that can be easily changed with another indicia marking section, that improves the manufacturing efficiency of producers by reducing the amount of time necessary to change indicia forming segments, and that increases the amount of information that can normally be conveyed with an indicia forming segment.

SUMMARY OF THE INVENTION

Accordingly, it is an object of the present invention to provide an improved mold with a changeable indicia forming segment.

It is another object to provide a mold with a indicia forming segment that can be easily attached and detached from the mold.

It is still another object to provide a mold with a changeable indicia forming segment that can create more complicated markings than that possible with rotary cores, while not incurring lengthy delays during the indicia changing process.

It is yet another object to provide a mold with a changeable indicia forming segment simplifies the indicia changing process and thus improves work efficiency.

To achieve these and other objects, a mold is provided the may be constructed with a core mold that has a mounting hole on its molding surface, a cavity mold that engages with the core mold to form a cavity between the two molds, and a changeable indicia forming segment provided that is used to form markings on an external surface of the injection molded products. The indicia forming segment is detachable and attachable into the mounting hole of the core mold. A stop means is also used to prevent the changeable indicia forming apparatus from moving relative to the core mold.

A second embodiment of a changeable indicia forming segment has an indicia forming segment fastenably mounted in a recess in the surface of the core mold. This also allows for quicker changing of the indicia forming segment than the traditional core mold with integrated indicia forming segment while allowing for more complicated markings to be created than that provided by rotary cores. Additionally, since all the markings created by the indicia forming segment of the present invention are relevant to the product produced, potential consumer confusion is reduced or eliminated. A third embodiment of a changeable indicia forming segment fastenably secures the indicia forming segment along an edge of the core mold to eliminate the potential for creating fastener markings near the indicia formed on the outer surface of the injection molded or die cast products. This changeable indicia forming segment of the present invention is usable with any molding process, such as die-casting, plastic injection molding, or metallic injection molding.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a cross-sectional view of an injection molding system illustrating both a mold and an injection molding machine;

FIG. 2 is a group of illustrations of the markings created by an indicia forming segment having a rotary core;

DETAILED DESCRIPTION OF THE DRAWINGS

Figure 3:
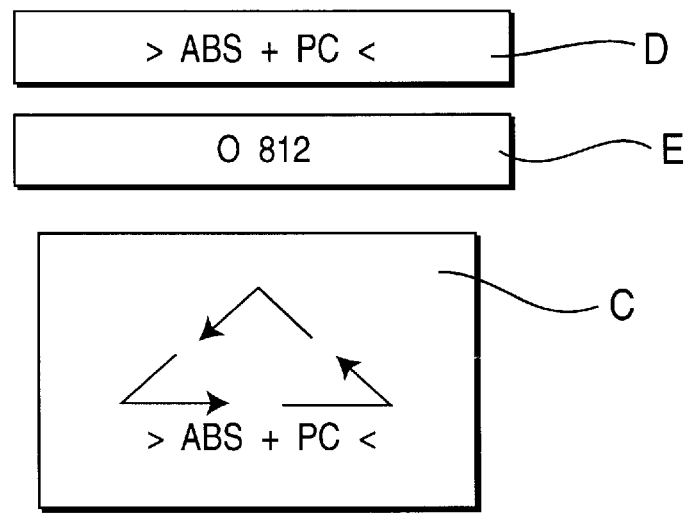
FIG. 3 is an illustration of the markings created by an indicia forming segment of the current invention illustrating the amount of information that can be conveyed while reducing the time delays in changing the indicia forming segment.

Turning now to the drawings, FIG. 1 shows an injection molding system that is constructed with both mold A and injection molding machine B. For ease of description, the end of the system on the left-hand side of the drawings will be referred to as the front end of the system and the opposite end, on the right-hand side of the drawings, will be referred to as the rear end of the system. Mold A contains core mold 4 and cavity mold 3. Cavity mold 3 contains cavity 1, that is filled with molten resin that is injected through nozzle 3A. Core mold 4 is inserted into cavity mold 3 causing outer surface 20 of core mold 4 to slide flush inside of inner surface 21 of cavity mold 3. Cavity 1 is formed between core mold 4 and cavity mold 3 when the two molds are fully engaged together. Top and bottom clamp plates 5 and 6 are mounted on the back surfaces of core mold 4 and cavity mold 3, respectively. A locking member (not shown) is fixed to each of clamp plates 5 and 6 to secure the two molds prior to beginning the molding process. The locking member is then removed prior to separating the molds to extract the product.

Injection molding machine B may be constructed using hopper 7, that is mounted to the rear end portion of longitudinal heating cylinder 8. Molten resin is introduced to heating cylinder 8 via hopper 7. Heating cylinder 8 heats the molten resin using a heating means (not shown) to maintain the molten state of the resin while feeding the resin into mold A. Rotatable screw 9 is axially positioned in heating cylinder 8 and the cylinder is connected to motor M via reduction gear G. Thus, screw 9 is rotationally driven by motor M. Screw 9 plasticizes the molten resin, acts as a typical plunger, and is operated by a cylinder actuator (not shown).

To form a product, such as the front and rear housings for a monitor, using the above injection molding system, molten resin is introduced into heating cylinder 8 through hopper 7. Then, the resin is fed to the front end of cylinder 8 while being heated and plasticized by both cylinder 8 and screw 9. In the front end of heating cylinder 8, the molten resin is pressurized by screw 9 prior to being injected into cavity 1 formed between both core mold 4 and cavity mold 3. The molten resin travels from heating cylinder 8 into cavity 1 via nozzle 3A of the cylinder and sprue 2 of top clamp plate 5 of cavity mold 3. The molten resin in cavity 1 is then formed into the desired product that has a shape that corresponds to the shape of cavity 1.

It is preferable to create a stamped figure or letter indicia on the product that indicates either or both the manufacturer or the material of a product during the injection molding process. To create the desired stamp on the injection molded product, indicia forming segment 10 may be integrated with core mold 4 in a position facing cavity 1, as shown in FIG. 1.

It is often necessary to stamp an indicia that indicates the kind of resin used, onto the surface of a molded product. Furthermore, it is not uncommon for a manufacturer to selectively use two or more kinds of resins in any particular injection molding process. Thus, necessitating a different indicia forming segment 10 for each type of plastic or composite used. One solution to the need for multiple indicia forming segments is shown in FIG. 2. To allow multiple combinations or types of plastic to be used, an indicia forming segment having a rotary core having an arrow mark that can be oriented to indicate the type of resin that was used to form the product. For example, when one of two kinds of resins, ABS resin and ABS+PC resin, is selected for use in an injection molding process, rotary arrow 22 is oriented so that the stamp will show the arrow pointing to the appropriate resin identifier 27. Indicia forming segment 10 has two stamps, one having the indicia ABS and the second having the indicia ABS+PC. The indicia forming segment is attached to the core mold and contains rotary core 23 that has arrow mark 22 that is rotatably mounted in the core mold at an intermediate position between the two stamps. When the resin used in the injection molding process is changed from one of ABS or ABS+PC to the other, rotary core 23 is rotated by a user to indicate the kind of resin used by aligning arrow 22 with appropriate indicia 27. The stamped indicia shown in FIG. 2 is indicative of ABS+PC resin having been used to form the product of the injection molding process. Rotary core 24 that uses arrow mark 25 may also be used to indicate the grade of a resin used in the injection molding process, as shown in FIG. 2. For example, if a manufacturer were using the three grades of resins C 2950, O 812 and O 810 alternatively in different injection molding processes, three grade stamps 28 could be oriented around rotary core 24 to enable easier changing of the identification of the resin a product is constructed with. FIG. shows that the grade of a resin used is O 812.

FIG. 3 shows an example of markings stamped on a molded product using a mold having a changeable indicia forming segment as constructed according to a first embodiment of the present invention. The amount of information that can be contained using a changeable indicia forming segment of the present invention is greater than that conveyable using an indicia forming segment with a rotatable core. Additionally, since all the information shown is pertinent to the product upon which the markings are formed, the chance of consumer confusion is reduced. Material type is shown in marking D, material grade is shown in marking E and further safety information with triangulate arrows can be shown in marking C, as shown in FIG. 3.

Figure 4:
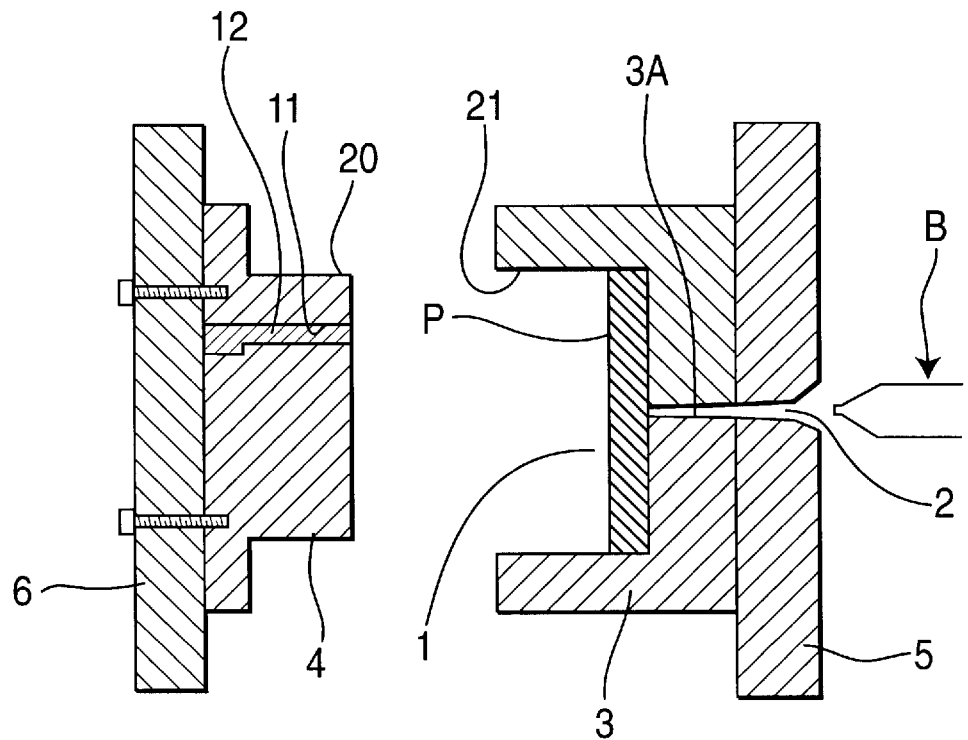
FIG. 4 is a cross-sectional view of a mold having a changeable indicia forming segment as constructed according to a first embodiment of the present invention.

FIG. 4 illustrates a mold with a changeable indicia forming segment as constructed according to the principles of the first embodiment of the present invention. The mold of this embodiment may be constructed of both cavity mold 3 and core mold 4. Cavity mold 3 has cavity 1 that receives the molten resin that is injected through nozzle 3A from injection molding machine B. Core mold 4 has an outer surface that precisely fits within the inner surface of cavity mold 3. Core mold 4 is insertably attached or detached with cavity mold 3 depending on whether the molding process is about to begin or whether the product is ready to be extracted. Top and bottom clamp plates 5 and 6 are mounted on the back surfaces of the two molds 3 and 4, respectively. Through hole 11 with step 29, is formed in core mold 4 at a predetermined position facing cavity 1. A changeable indicia forming insert 12, with both step 29 and indicia forming segment 10, is detachably inserted into through hole 11 of core mold 4. This secures the changeable indicia forming insert while allowing the indicia forming segment to stamp markings onto the external surface of product P during a molding process. Since changeable indicia forming insert 12 is detachably attached to core mold 4, it is easy to change the content of the indicia when necessary.

Before beginning an injection molding process, cavity mold 3 is clamped to top clamp plate 5 using a clamping means (not shown) and core mold 4 is clamped to bottom clamp plate 6 by a plurality of clamp bolts. Changeable indicia forming insert 12 is inserted into through hole 11 from the left to the right with indicia forming segment 10 being exposed to the outside of the molding surface of core mold 4. Then, bottom clamp plate 6 is fastenably attached to core mold 4. This secures changeable indicia forming insert 12 inside of through hole 11 and prevents the insert from unexpectedly detaching from core mold 4. Then, core mold 4 and cavity mold 3 are opposingly oriented and engaged to form cavity 1. The front end of injection molding machine B is arranged at the inlet of sprue 2 in top clamp plate 5. During the injection molding process, molten resin from injection molding machine B is injected via into cavity 1 through both sprue 2 in top clamp plate 5 and through nozzle 3A in cavity mold 3. Molten resin in cavity 1 is formed into product P having a form that corresponds to the shape of cavity 1. During the injection molding process, a figure or letter indicia is created on the external surface of the product P by indicia forming segment 10 of changeable indicia forming insert 12. As shown in FIG. 3, the markings formed on product P may include, for example, safety standard indicia C with triangulate arrows, a material indicia D, and a grade indicia E.

Figure 5:
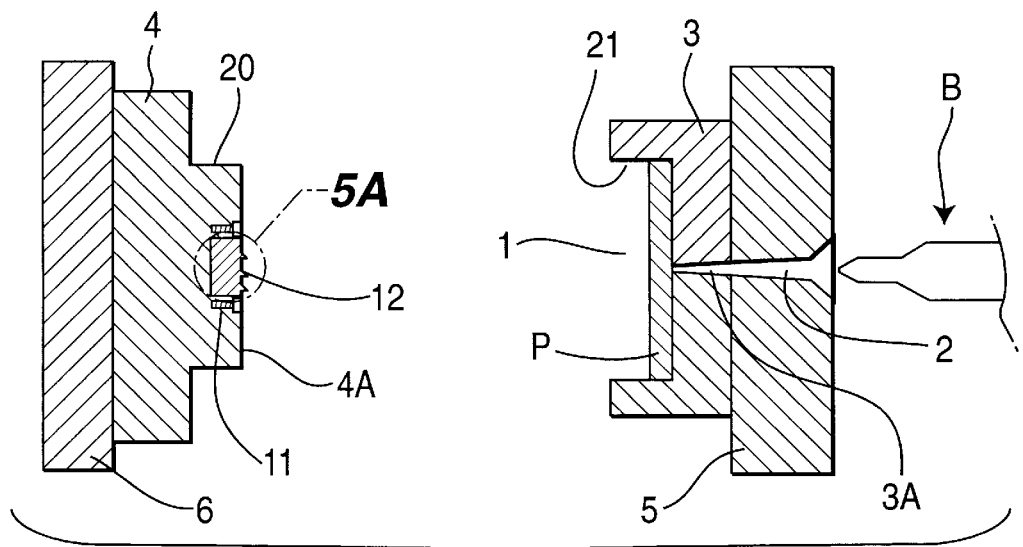
FIGS. 5 and 5A together form a cross-sectional view of a mold having a changeable indicia forming segment as constructed according to a second embodiment of the present invention.
Figure 5A:
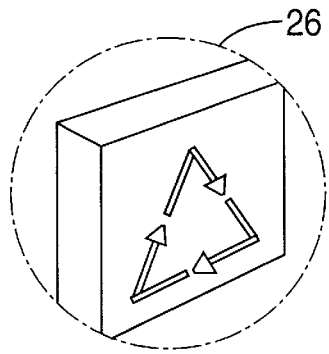

FIGS. 5A and 5A together show the construction of a mold with a changeable indicia forming segment as constructed in accordance with the second embodiment of the present invention. Changeable indicia forming insert 12 is detachably attached to core mold 4 from the right to the left by a plurality of locking fasteners 11. This embodiment is advantageous because it does not require separating core mold 4 from bottom clamp plate 6 when changeable indicia forming insert 12 is changed with another insert having a different indicia forming segment 10. However, the heads of the locking fasteners 11 may leave undesirable trace markings on product P. Such traces, caused by the fastener's heads, may be negligible when the product has a relatively large size, but the traces may seem prominent when the product produced is of a smaller size.

Figure 6:
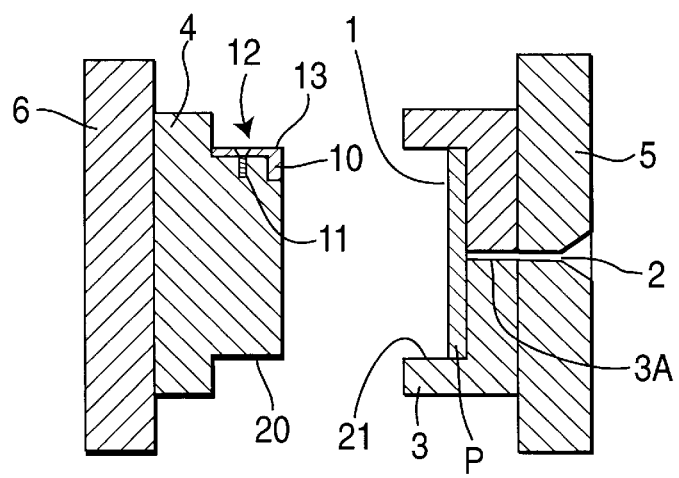
FIG. 6 is a cross-sectional view of a mold having a changeable indicia forming segment as constructed according to a third embodiment of the present invention.
Figure 7:
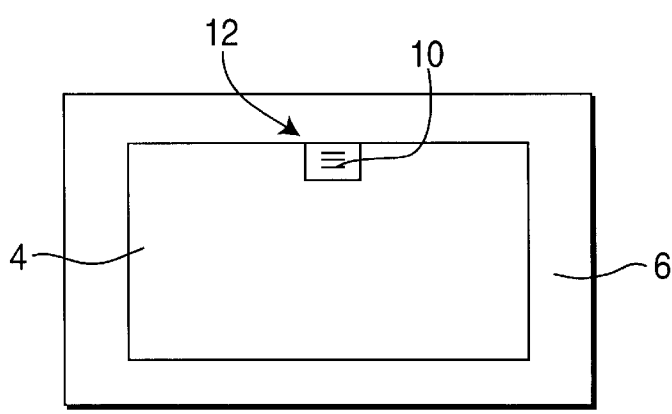
FIG. 7 is a front view of the mold having a changeable indicia forming segment of FIG. 6.

FIGS. 6 and 7 show a third embodiment of changeable indicia forming insert 12 that is easily changeable with another insert and does not create undesirable traces on the product. Changeable indicia forming insert 12 is detachably fastened to the top side of core mold 4 by a plurality of locking fasteners 11. Indicia forming segment 10 of the changeable indicia forming insert faces cavity 1. The location of the fasteners prevents any trace markings from being left on product P, while still allowing for the rapid changing of the inserts without the delay caused by using core molds and indicia forming segments that are integrally formed.

In the above-described embodiments, the changeable indicia forming insert 12 is detachably fastened to core mold 4 so that the indicia forming segment of insert 12 is easily exchangeable with a new insert without incurring the delays caused by using inserts and indicia forming segments that are integrally formed from a unitary piece of material. Additionally, the content of the markings that can be formed is greater than that possible using core molds with rotary cores. The mold of the present invention improves work efficiency during the manufacturing process by reducing the delay caused by changing indicia forming inserts. This leads to a corresponding reduction in production costs and allows products to be sold at more competitive prices. Furthermore, the markings formed by the present invention are all relevant to the product produced, as opposed to the marks created by rotary cores, thus eliminating potential consumer confusion. This invention is applicable to any molding processes, such as die-casting, plastic injection molding, and metallic injection molding.

Although these three preferred embodiments of the present invention have been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A mold, comprising:
  a cavity mold comprising a first plate having a recess forming a first molding surface;
  a core mold comprising a plug having a second molding surface and being selectively engageable with said recess in said cavity mold to form a molding cavity between said core mold and said cavity mold, said core mold having a hollow extending from said second molding surface through said plug to an outer surface opposite from said second molding surface, said hollow in said core mold having a step on one side of the hollow, and having a larger cross-sectional area at said outer surface than at said second molding surface;
  a column bearing an indicia forming segment on a distal end and being insertable into said hollow from said outer surface, said column being integral and said distal end of said column being flush with said second molding surface and causing said indicia forming segment to protrude into said molding cavity, said indicia forming segment forming a plurality of markings on an outer surface of a molded product;
  securing means for preventing said column from moving relative to said second molding surface;
  a first clamp plate secured to said outer surface of said core mold;
  a second clamp plate secured to an exterior surface of said cavity mold opposite from said first molding surface and having a sprue for guiding a plurality of molten material into said molding cavity; and
  a clamp detachably joining said first clamp plate to said second clamp plate.

2. The mold of claim 1, further comprising a second column interchangeable with said column and bearing a different indicia from said column.

3. The mold of claim 1, with said securing means comprising:
  said column having a protruding section engageable with a seating surface created by the counterboring of said hollow, said protruding section securing said indicia forming segment relative to said second molding surface.

4. The mold of claim 1, further comprised of said core mold having a plurality of fastener bores to fasten said first clamp plate to said core mold.

5. The mold of claim 1, further comprised of said clamp being one of a fastener and a pressure clamp device.

6. The mold of claim 1, further comprised of said molding cavity being defined by said first molding surface and said second molding surface.

7. The mold of claim 1, further comprising:
  an injection molding device attached to said sprue;
  a heating means attached in said injection molding device for transforming a plurality of material into said molten material;
  a hopper contained in said injection molding device, holding said molten material;
  said hopper feeding said molten material into a heated cylinder, attached to said injection molding device, containing plasticizing means driven by a motor via a reduction gear, said heated cylinder having a nozzle on a distal end; and
  said injection molding device conveying said molten material to said molding cavity via said nozzle, said sprue in said second clamp plate, and a bore in said cavity mold.

8. An injection molding device, comprising:
  a heater disposed to transform a material into a molten material;
  a hopper attached to said heater, holding said molten material;
  a heated cylinder attached to said hopper, having plasticizing means driven by a motor via a reduction gear, and having a nozzle;
  a mold positioned to receive said molten material from said nozzle of said heated cylinder, said mold comprising:
    a cavity mold comprising a first plate having a recess forming a first molding surface; and
    a core mold comprising a plug having a second molding surface and being selectively engageable with said recess in said cavity mold to form a molding cavity; and
  a member bearing an indicia forming segment on one surface and being insertable into said core mold from a side opposite to said second molding surface, said member having a step on one side of the member and being free from rotation relative to said core mold.

9. The injection molding device of claim 8, further comprising:
  said one surface of said member being flush with said second molding surface causing said indicia forming segment to protrude into said molding cavity, said indicia forming segment forming a plurality of markings on an outer surface of a molded product; and
  a first clamp plate fastenably secured to said core mold to secure said member in position inside said core mold.

10. An injection molding apparatus, comprising:
  a cavity mold assembly, comprising:
    a top clamp plate having a sprue formed therein; and
    a cavity mold attached to the top clamp plate, said cavity mold having a cavity and said cavity mold having a nozzle formed in the cavity mold extending from the sprue to the cavity;
  an injection molding machine for injecting molten resin into the cavity through the sprue; and
  a core mold assembly engaging the cavity mold assembly, for defining a side of the cavity, said core mold assembly comprising:
    a bottom clamp plate;
    a core mold attached to the bottom clamp plate, said core mold assembly insertable flush with the inner surface of the cavity mold, said core mold having a recess formed in a portion thereof extending through the core mold to the bottom clamp plate and being shaped to form a step toward the bottom clamp plate;

an indicia-forming insert detachably mounted in and filling the recess in the core mold, said indicia-forming insert being integral and not having cylindrical symmetry along the length of the recess; and an indicia-forming segment, integral with the indicia-forming insert, said indicia-forming segment facing the cavity of the cavity mold.

* * * * *